United States Patent Office 3,369,063
Patented Feb. 13, 1968

3,369,063
O,O-BIS[2-(DISUBSTITUTED-AMINO)ETHYL] DITHIOPHOSPHATES
John F. Olin, Ballwin, Mo., and Ivan C. Popoff, Ambler, Pa., assignors to Pennsalt Chemicals Corporation, Philadelphia, Pa., a corporation of Pennsylvania
No Drawing. Filed Oct. 27, 1964, Ser. No. 406,924
7 Claims. (Cl. 260—945)

ABSTRACT OF THE DISCLOSURE

O,O - bis[2 - (disubstituted - amino)ethyl]dithiophosphates having the structure

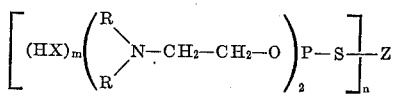

where R is lower alkyl, Z is selected from the group consisting of hydrogen, alkali metal and alkaline earth metal, X is halogen, $n$ is a digit equal to the valence of $n$ and $m$ is a digit from 0 to 2.

---

The compounds of the present invention have the formula:

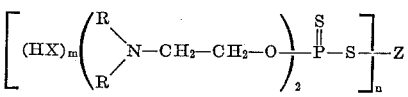

where R is lower alkyl (e.g. alkyl and cycloalkyl containing one to six carbon atoms), Z is selected from the group consisting of hydrogen, lower alkyl, alkali metal and alkaline earth metal, X is halogen, $n$ is a digit numerically equal to the valence of Z, and $m$ is a digit from 0 to 2. The preferred compounds of the invention are those where X is chlorine and $m$ is 2, and Z is H or alkyl; i.e. they are dihydrochloride salts of the O,O-bis[2-(disubstituted-amino)ethyl]dithiophosphates. These preferred phosphorus containing hydrochlorides of the invention are typically prepared by reacting 2-diethylaminoethanol hydrochloride with phosphorus pentasulfide according to the following reaction:

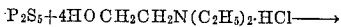

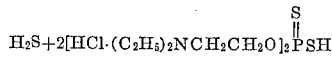

The reaction is preferably carried out in a solvent inert to the reactants, such as chloroform or trichlorotrifluoroethane, with agitation employed during the reaction. The reaction time is not critical but will generally be from about 15 minutes to twenty-four hours with periods of from one half to three hours being preferred. Likewise, temperature, while not critical, should preferably be in the range of from 40° to about 80° C. and most preferably in the range of 55° to 65° C.

The N,N-dialkylaminoethanol hydrochloride starting materials can be conveniently made by the reaction of the alcohol with HCl in a solvent which does not enter into the reaction. The product can readily be isolated by removing the solvent by distillation or filtration after the reaction is complete. It will be understood that instead of preparing the hydrochloride salt, other halogen salts such as the hydrofluoride, hydroiodide and hydrobromide may be prepared in like manner.

The new phosphorus containing hydrohalides of the invention are useful as systemic miticides, and also as lubricating oil and rubber antioxidants. Other applications include use as extreme pressure lubricating oil additives and as ore flotation agents.

The new hydrohalide compounds of the present invention include but are not limited to the following specific compounds:

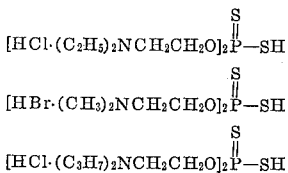

The new hydrohalides of the present invention may themselves be reacted with metals or metal compounds to form metal phosphorodithioates having the formula:

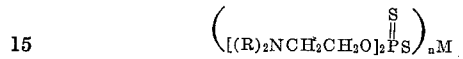

where M is an alkali or alkaline earth metal; i.e. Na, K, Cs, Ba, Ca, Sr, and the like, and $n$ is one to two corresponding to the valence of M.

The most preferred reaction by which the metal salts are formed is illustrated as follows:

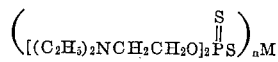

In addition to the metal hydroxide shown above other metal compounds can be employed such as oxides, and acetates. In non-aqueous media, metals such as Na or K may also be used to carry out the reaction.

A preferred embodiment of the preparation of the metal phosphorodithioates of the present invention is performed by dissolving the O,O-bis[2-diethylamino)ethyl] hydrogen dithiophosphate dihydrochloride in water and then adding with stirring an aqueous solution of one of the above-listed metal salts, metal oxides, or metal hydroxides. The reaction time will usually be from about 15 minutes to about 24 hours with reaction times of from 30 minutes to three hours being preferred. The reaction may be batch or continuous. The reaction product may be recovered by removing the solvent by distillation, preferably at 10°–50° C. and at one to about five millimeters of mercury vacuum. Where desired, the new metal phosphorodithioate can be separated from the metal chloride formed as byproduct. The separation can be accomplished by conventional means, such as recrystallization or extraction with a suitable solvent.

The new metal compounds of the present invention include, but are not limited to the following specific compounds:

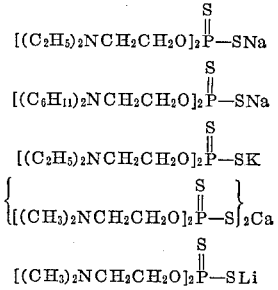

The new metal salts are useful as systemic miticides and also as antioxidants for rubber and lubricating oil.

The new metal salts of the present invention may be reacted to form valuable compounds herein referred to as S-esters, having the following formula:

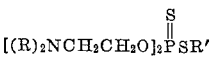

where R and R' are the same or different alkyl groups as previously defined.

The S-esters of this invention can be prepared by reacting the metal salts of the invention with alkyl halides and preferably with alkyl halides having from one to about six carbon atoms and most preferably with one to six carbon atom alkyl iodides. The reaction is illustrated as follows:

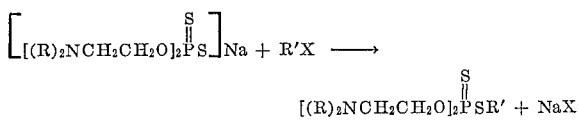

In a preferred embodiment of the preparation of the new S-esters, a metal salt such as S-sodium O,O-bis[2-(diethylamino)ethyl] dithiophosphate is dissolved in water and approximately equal molar quantity of ethyl iodide or other lower alkyl iodide is added with stirring. The reaction time will preferably be from about 15 minutes to about 24 hours and preferably from 30 minutes to about 3 hours. The reaction product may be recovered by distillation or by other conventional means. The reaction may be batch or continuous.

The new S-esters of the present invention are useful as systemic miticides and also as antioxidants for rubber and lubricating oil.

The new S-esters of the present invention include but are not limited to the following compounds:

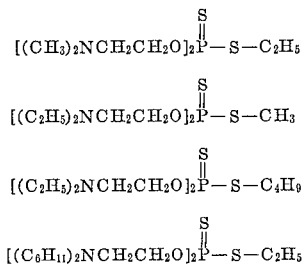

The compounds of the present invention can be employed as insecticides either directly, undiluted, or in a variety of compositions both liquid and solid, including solutions, concentrates, emulsifiable concentrates, slurries, finely-divided powders, granular materials and pastes. The compounds may be employed either alone in compositions as the essential pesticidal ingredient or with other pesticides. Useful compositions can also include as other ingredients diluents, extenders, fillers, conditioners, solvents and water. For example, compositions may include, in dust formulations, various clays, diatomaceous earth, talc, and powdered proteinaceous materials, such as powdered cereal wastes. Solvent compositions can include emulsions, suspensions or solutions in inert organic carriers such as: acetone, kerosene, benzene, toluene, xylene, various naphthas, including e.g. Stoddard solvent, and other petroleum distillate fractions or mixtures thereof. It will frequently be found desirable to use wetting or emulsifying dispersing agents to facilitate useful formulation and for this purpose non-ionic surfactants will generally be preferred.

The compounds of this invention and formulations containing the compounds as essential pesticidal ingredients are preferably applied in liquid form, e.g. as an emulsion in water or a solution in a hydrocarbon oil. Such formulations will preferably contain at least about 0.005% and preferably from about 0.01% to about 15% of at least one of the compounds of the present invention. The formulations to be applied in dust form will preferably contain 0.005% or more and most preferably will contain from about 1% to about 20% of the compounds of the invention.

The compositions containing the compounds of the invention are applied directly to the locus to be protected. For example, the area around and on economic plants already infested with insects or to plants on which infestation is to be prevented. The compositions may be used either in direct contact or as systemic pesticides.

In general, a quantity from at least about 0.1 pound per acre of the new compound and preferably from about 1.0 to about 100 pounds per acre is used on plants. However, in specialized instances substantially larger amounts may be used.

EXAMPLE 1

*Preparation of O,O-bis[2-(diethylamino)ethyl] hydrogen dithiophosphate dihydrochloride*

To a suspension of 22.2 grams of phosphorus pentasulfide in 300 cc. of chloroform is added a solution of 62 grams 2-diethylaminoethanol hydrochloride in chloroform with stirring at 55° to 58° C. Nitrogen is passed during a 1 hour heating period. The mixture is stirred for an additional two hours while the solvent is distilled off. The product O,O-bis[2-(diethylamino)ethyl] hydrogen dithiophosphate dihydrochloride is an oil.

*Analysis.*—Calculated for $C_{12}H_{31}Cl_2N_2O_2S_2P$: 7.7% N, 9.71% Cl, 17.67% S. Found: 8.3% N, 9.4% Cl, 18.6% S.

EXAMPLE 2

*Preparation of S-sodium O,O-bis[2-(diethylamino)ethyl] dithiophosphate*

Twenty grams of crude O,O-bis[2-(diethylamino)ethyl] hydrogen dithiophosphate dihydrochloride is dissolved in 50 cc. of water and a solution of 6 grams of sodium hydroxide in 20 cc. of water is added with stirring. After a reaction time of about 30 minutes the reaction product is freed from water by evaporation at approximately 20° C. and from 1 to about 5 millimeters of mercury pressure. The solid residue is S-sodium O,O-bis[2-(diethylamino)ethyl] dithiophosphate which contains some sodium chloride. The white, solid crystalline product is recovered by conventional fractional recrystallization.

When a solution of calcium hydroxide is substituted for sodium hydroxide in the above process, the corresponding calcium salt is obtained.

EXAMPLE 3

*Preparation of S-ethyl bis[2-(diethylamino)ethyl] dithiophosphate*

An aqueous solution of the sodium salt of

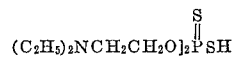

is reacted with a slight excess of ethyl iodide at about 80° C. After about one hour the product is extracted with toluene and the product ester is recovered by evaporation of the toluene.

EXAMPLE 4

*Preparation of O,O-bis[2-(diethylamino)ethyl] dithiophosphate*

An aqueous solution of S-sodium O,O-bis[2-(diethylamino)ethyl] dithiophosphate is passed through a weakly acidic ion exchange resin, (Rohm and Haas Amberlite IRC–50) and then evaporated to dryness to obtain the crude semisolid O,O-bis[2-(diethylamino)ethyl] dithiophosphate.

When this compound is tested according to the procedures of Example 5, it is found effective as a pesticide.

EXAMPLE 5

*Determination of miticidal activity*

The procedure used in testing the compounds is as follows: Bean plants of the type designated Henderson Bush Lima are cut and their cut ends are immersed in water in a test tube. The plants are held for at least 24 hours to harden off and in most cases were held longer until roots had formed. The water in the test tubes is then replaced with solutions of the material to be tested and the plants are then infested with colonies of the two spotted mite,

*Tetranychus dimaculatus* Harvey. The aqueous test solutions are made up in the amounts of about 100 ml. at concentrations of 0.01%, 0.05% and 0.1%, as well as at other concentrations as specified in the examples. Each of the tests is performed in three replicates. Water is added as necessary, to maintain the level of liquid in the test tubes.

The plants are checked at approximately 24 hour intervals and the activity is noted as described in the examples.

Results with O,O-bis[2-(diethylamino)ethyl] hydrogen dithiophosphate dihydrochloride are as tabulated below:

| Percent by Weight Compound in Solution | Method of Application | Percent Kill 2-spotted mite |
|---|---|---|
| 0.1 | Cut stem | 100% in ¾ days. |
| 0.05 | do | 98% in 8 to 11 days. |
| 0.02 | do | 68% in approximately 1 week. |

EXAMPLE 6

*Pesticidal activity of the new S-metal dithiophosphate derivatives*

Similar test results with solutions of S-sodium O,O-bis[2-(diethylamino)ethyl] dithiophosphate are as tabulated below:

| Percent by Weight Compound in Solution | Method of Application | Percent Kill 2-spotted mite |
|---|---|---|
| 0.1 | Cut stem | 88% in 6-7 days. |
| 0.05 | do | 81% in approximately 8 days. |
| 0.02 | do | 93% in approximately 11 days. |

EXAMPLE 7

*Miticidal activity of the new S-alkyl-O,O-bis[2-(diethylamino)ethyl] dithiophosphate compounds*

When S-ethyl O,O-bis[2-(diethylamino)ethyl] dithiophosphate is tested according to the procedures described in Example 1 the results are similar to those of Example 1.

It should be understood that the invention as herein disclosed is susceptible to a number of modifications and variations and that the invention is intended to include all such embodiments and is not to be restricted by the illustrative examples herein provided.

What is claimed is:

1. Compounds having the structural formula

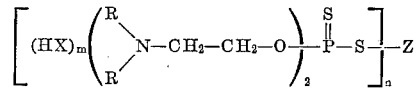

where R is lower alkyl, Z is selected from the group consisting of hydrogen, alkali metal and alkaline earth metal, X is halogen, $n$ is a digit equal to the valence of Z, and $m$ is a digit from 0 to 2.

2. A compound having the structure

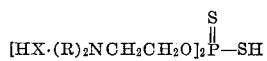

where R is lower alkyl having from 1 to 6 carbon atoms, and where X is halogen.

3.

4. Compounds having the structure:

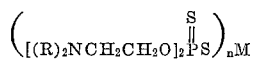

where R is lower alkyl, M is selected from the group consisting of hydrogen, alkali metal and alkaline earth metal, and $n$ is a digit equivalent to the valence of M.

5.

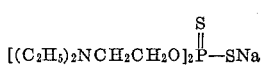

6.

7.

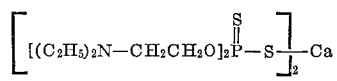

References Cited

UNITED STATES PATENTS 2,911,430  11/1959  Fitch _____ 260—945

CHARLES B. PARKER, *Primary Examiner.*

B. BILLIAN, A. H. SUTTO, *Assistant Examiners.*